United States Patent
Pletka et al.

(10) Patent No.: US 11,656,792 B2
(45) Date of Patent: May 23, 2023

(54) MIRRORING DATA IN WRITE CACHES OF A CONTROLLER OF A NON-VOLATILE MEMORY

(71) Applicant: INTERNATIONAL BUSINESS MACHINES CORPORATION, Armonk, NY (US)

(72) Inventors: Roman Alexander Pletka, Uster (CH); Timothy J. Fisher, Cypress, TX (US); Adalberto Guillermo Yanes, Sugar Land, TX (US); Nikolaos Papandreou, Thalwil (CH); Radu Ioan Stoica, Zurich (CH); Charalampos Pozidis, Rueschlikon (CH); Nikolas Ioannou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/361,662

(22) Filed: Jun. 29, 2021

(65) Prior Publication Data

US 2022/0413762 A1 Dec. 29, 2022

(51) Int. Cl.
  *G06F 12/02* (2006.01)
  *G06F 3/06* (2006.01)
  (Continued)

(52) U.S. Cl.
  CPC ............ *G06F 3/0656* (2013.01); *G06F 3/061* (2013.01); *G06F 3/0604* (2013.01);
  (Continued)

(58) Field of Classification Search
  CPC ............... G06F 12/0246; G06F 2/0679; G06F 2212/7201; G06F 2212/7203; G06F 3/061;
  (Continued)

(56) References Cited

U.S. PATENT DOCUMENTS

| | | | |
|---|---|---|---|
| 5,586,291 A | 12/1996 | Lasker et al. | |
| 8,924,629 B1 * | 12/2014 | Call | G06F 12/0246 711/103 |
| 10,180,792 B1 * | 1/2019 | Gaertner | G06F 11/1441 |

(Continued)

FOREIGN PATENT DOCUMENTS

CN 110196818 A 9/2019

OTHER PUBLICATIONS

Operating Systems Three Easy Pieces; Flash based SSDs; by Arpaci (Year: 2020).*
Dell EMC Unity; by Dell; Feb. 2021 (Year: 2021).*
Anonymous, Method and Apparatus for Memory Mirroring in Servers With Nonvolatile Memory, IP.com No. PCOM000239579D, Publication Date: Nov. 17, 2014.
(Continued)

*Primary Examiner* — Paul M Knight
(74) *Attorney, Agent, or Firm* — Brian F. Russell; Eyal Gilboa

(57) ABSTRACT

A data storage system provides persistent storage in bulk non-volatile memory. A controller of the data storage system receives a host write command and buffers associated host write data in both a first write cache in non-volatile memory and a mirrored second write cache in volatile memory. The controller destages the host write data to the bulk non-volatile memory from the second write cache but not the first write cache. The controller services relocation write commands requesting data relocation within the bulk non-volatile memory by reference to the second write cache. Servicing the relocation write commands includes buffering relocation write data in the second write cache but not the first write cache and destaging the relocation write data to the bulk non-volatile memory from the second write cache.

18 Claims, 10 Drawing Sheets

(51) Int. Cl.
*G06F 12/0844* (2016.01)
*G06F 12/0868* (2016.01)

(52) U.S. Cl.
CPC .......... *G06F 3/0611* (2013.01); *G06F 3/0613* (2013.01); *G06F 3/0659* (2013.01); *G06F 3/0679* (2013.01); *G06F 12/0246* (2013.01); *G06F 12/0844* (2013.01); *G06F 12/0868* (2013.01); *G06F 2212/72* (2013.01); *G06F 2212/7201* (2013.01); *G06F 2212/7203* (2013.01)

(58) Field of Classification Search
CPC .... G06F 3/0656; G06F 3/0659; G06F 3/0679; G06F 3/0604; G06F 3/06; G06F 12/0844; G06F 3/0611; G06F 3/0613; G06F 12/0846; G06F 12/0866; G06F 12/0868; G06F 12/12
See application file for complete search history.

(56) References Cited

U.S. PATENT DOCUMENTS

| | | |
|---|---|---|
| 2008/0104344 A1 | 5/2008 | Shimozono et al. |
| 2011/0022801 A1 | 1/2011 | Flynn |
| 2013/0205076 A1 | 8/2013 | Schuette et al. |
| 2017/0228191 A1* | 8/2017 | Sun ................ G06F 3/0647 |
| 2020/0089609 A1* | 3/2020 | Colline ........... G06F 12/0246 |
| 2020/0150899 A1* | 5/2020 | Kim ................ G06F 3/0656 |
| 2020/0192826 A1* | 6/2020 | Ben-Simon ...... G06F 12/1491 |
| 2021/0064291 A1* | 3/2021 | Kanno ............ G06F 12/0246 |
| 2021/0216239 A1* | 7/2021 | Dutta ............. G06F 12/0253 |

OTHER PUBLICATIONS

English translation of Abstract of CN110196818 (A), Sep. 3, 2019, 1 page.
Search report in Taiwanese Application No. 111103286 filed Jan. 26, 2022, 10 pages.

* cited by examiner

MIRRORING DATA IN WRITE CACHES OF A CONTROLLER OF A NON-VOLATILE MEMORY

BACKGROUND OF THE INVENTION

The present disclosure is generally directed to data storage and, more particularly, to non-volatile memory systems. Still more particularly, the present disclosure is directed to non-volatile memory systems including mirrored write caches that buffer host write data in both volatile and non-volatile memory.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in physical blocks (also referred to as "erase blocks") of memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Data is written to the NAND flash memory in logical pages, each including, for example, 4 kB or 16 kB of data. A given physical page of memory may store one or more logical pages of data. As data is updated, logical pages storing stale data become invalid, leaving physical blocks with a mixture of physical pages containing valid data and invalid data. Eventually, a controller of the NAND flash memory recovers the storage capacity consumed by the physical pages holding invalid data through a process called garbage collection. In garbage collection, still-valid data is re-written from a first physical block into one or more previously erased physical blocks. The first physical block can then be erased in preparation for re-programming.

In enterprise-class NAND flash-based storage systems, preventing data loss, for example, in the case of a power failure, is of paramount importance. Consequently, in such data storage systems, the flash controller can only acknowledge a host write command after host write data associated with the host write command has been made persistent in non-volatile storage. In a first prior art design, the flash controller initially buffers incoming host write data in a write cache implemented in a low-cost volatile memory technology, such as dynamic random access memory (DRAM). The flash controller then destages the host write data from the DRAM write cache into the NAND flash memory. Once all the write data associated with the host write command is persistent in the NAND flash memory (and thus protected against data loss in the event of a loss of power), the flash controller sends an acknowledgement to the host, freeing resources in the host allocated to track completion of the host write command. Relocation writes made in conjunction with garbage collection in the NAND flash memory are similarly buffered in the DRAM write cache prior to being destaged back to the NAND flash memory. This first architecture has the advantage of a simple, relatively low cost design, but has the disadvantage of relatively poor write performance in that the acknowledgement to the host is delayed until the host write data is made persistent in the NAND flash memory.

To provide improved write performance compared to this first prior art design, a second prior art design implements a non-volatile write cache, for example, in battery-backed DRAM, magnetoresistive RAM (MRAM), ferroresistive RAM (FRAM), phase change memory (PCM), or other non-volatile memory technology. With this design, write performance is significantly improved because the flash controller can send an acknowledgement of the host write command to the host as soon as the associated host write data are written into the write cache, and thus, before the host write data are fully destaged from the non-volatile write cache to the NAND flash memory. Relocation writes made in conjunction with garbage collection are similarly first written into the non-volatile write cache prior to being destaged to the NAND flash memory. This second prior art architecture provides significantly better write performance than the first prior art architecture, but does so with the trade-offs of greater complexity and higher cost due to price disparity between implementing the write cache in volatile memory (e.g., DRAM) versus non-volatile memory (e.g., MRAM).

In view of the prior art, the present application appreciates that it would be useful and desirable to provide an improved data storage system that implements a non-volatile write cache that permits acknowledgement of host write commands prior to destaging the associated host write data to NAND flash memory while also reducing the cost of the memory utilized to implement the non-volatile write cache for a given level of write performance.

BRIEF SUMMARY

In at least one embodiment, a method of managing a data storage system providing persistent storage in bulk non-volatile memory is provided. A controller of the data storage system receives a host write command and buffers associated host write data in both a first write cache in non-volatile memory and a mirrored second write cache in volatile memory. The controller destages the host write data to the bulk non-volatile memory from the second write cache but not the first write cache. The controller services relocation write commands requesting data relocation within the bulk non-volatile memory by reference to the second write cache. Servicing the relocation write commands includes buffering relocation write data in the second write cache but not the first write cache and destaging the relocation write data to the bulk non-volatile memory from the second write cache.

In at least one embodiment, a data storage system includes a controller of a bulk non-volatile memory. The controller is configured to receive a host write command and to buffer associated host write data in both a first write cache in non-volatile memory and a mirrored second write cache in volatile memory. The controller destages the host write data to the bulk non-volatile memory from the second write cache but not the first write cache. The controller services relocation write commands requesting data relocation within the bulk non-volatile memory by reference to the second write cache. Servicing the relocation write commands includes buffering relocation write data in the second write cache but not the first write cache and destaging the relocation write data to the bulk non-volatile memory from the second write cache.

In at least one embodiment, a program product includes a storage device and program code stored in the storage device that is executable by a controller of a bulk non-volatile memory. When executed, the program code causes the controller to receive a host write command and to buffer associated host write data in both a first write cache in non-volatile memory and a mirrored second write cache in volatile memory. The controller destages the host write data to the bulk non-volatile memory from the second write cache but not the first write cache. The controller services relocation write commands requesting data relocation within the bulk non-volatile memory by reference to the second write cache. Servicing the relocation write commands includes buffering relocation write data in the second write cache but not the first write cache and destaging the relocation write data to the bulk non-volatile memory from the second write cache.

In at least one embodiment, prior to completion of the destaging of the host write data to the bulk non-volatile memory, the controller sends to a host an acknowledgement of the host write command based on the host write data being buffered in the first write cache.

In at least one embodiment, the bulk non-volatile memory includes flash memory and the controller generates at least some of the relocation write commands during garbage collection in the flash memory.

In at least one embodiment, the controller frees, in the first write cache, the host write data of the host write command based on completion of destaging of the host write data to the bulk non-volatile memory.

In at least one embodiment, the controller records in an entry of a logical-to-physical translation data structure at least a first location of host write data in the first write cache. Based on destaging of the host write data to the bulk non-volatile memory, the controller updates the entry to indicate a different second location in the bulk non-volatile memory.

In at least one embodiment, the controller additionally records in the entry of the logical-to-physical translation data structure a third location of host write data in the second write cache.

In at least one embodiment, the bulk non-volatile memory includes the first write cache.

In at least one embodiment, the controller maintains in the first write cache and in the second write cache a plurality of buffers each corresponding to a respective one of a plurality of different write heats.

DETAILED DESCRIPTION

Figure 1A:
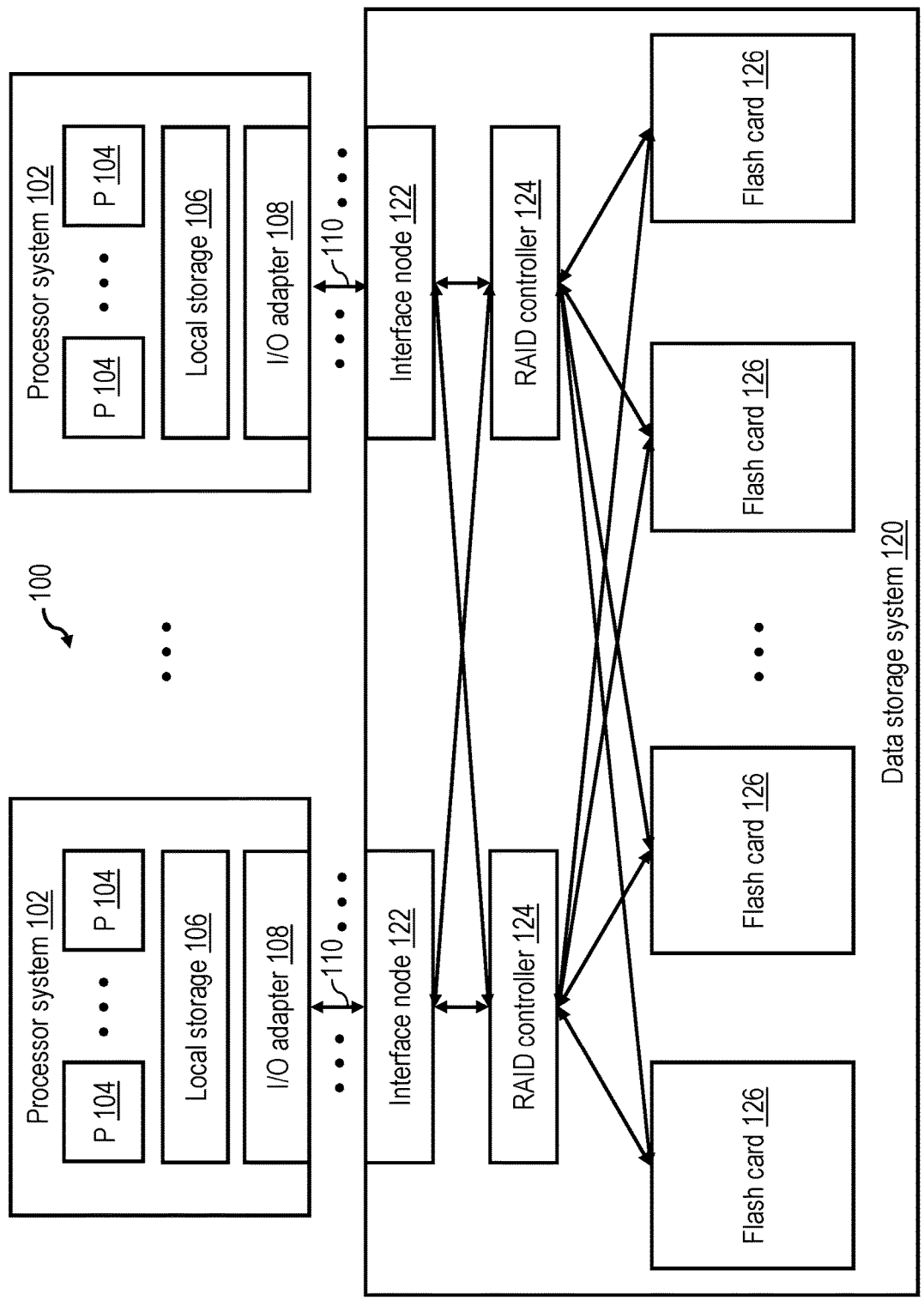
FIG. 1A is a high level block diagram of a data processing environment in accordance with one embodiment.

With reference to the figures and with particular reference to FIG. 1A, there is illustrated a high-level block diagram of an exemplary data processing environment 100 including a data storage system 120 having a mirrored write cache as described further herein. As shown, data processing environment 100 includes one or more hosts, such as a processor system 102 having one or more processors 104 that process instructions and data. Processor system 102 may additionally include local storage 106 (e.g., DRAM or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Non-volatile Memory Express (NVMe), NVMe over Fabrics (NVMe-oF), etc. I/O commands communicated via I/O channel 110 include host read commands by which a processor system 102 requests data from data storage system 120 and host write commands by which a processor system 102 requests storage of data in data storage system 120.

In the illustrated embodiment, data storage system 120 includes multiple interface nodes 122 through which data storage system 120 receives and responds to I/O commands via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
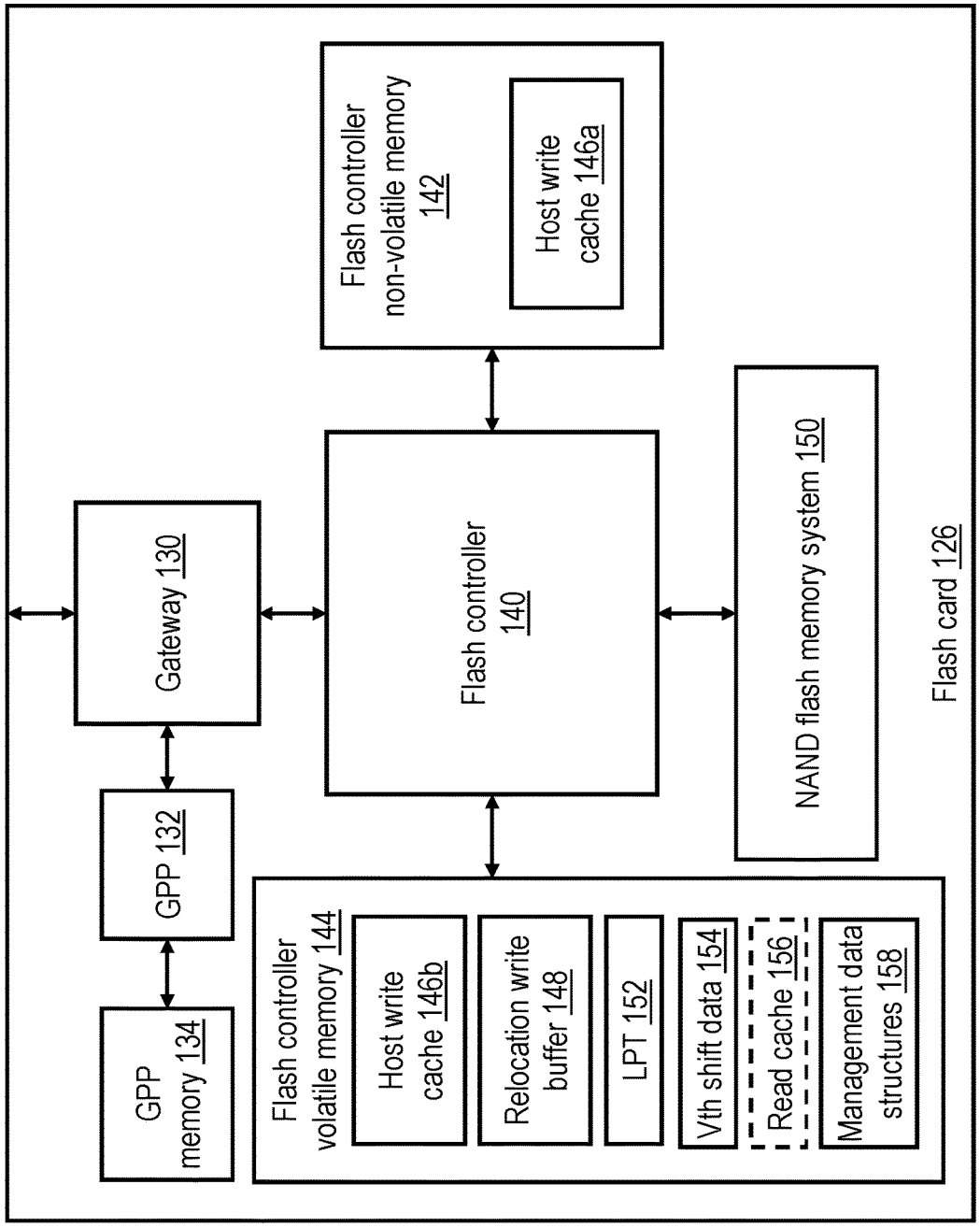
FIG. 1B is a more detailed block diagram of an exemplary flash card of the data storage system of FIG. 1A in accordance with a first embodiment.

FIG. 1B depicts a more detailed block diagram of a flash card 126 of data storage system 120 of FIG. 1A in accordance with a first embodiment. In this embodiment, flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of I/O commands received by gateway 130, scheduling servicing of the I/O commands by flash card 126, and/or performing other management functions. GPP 132 is coupled to a GPP memory 134 (e.g., DRAM) that can conveniently buffer data created, referenced, and/or modified by GPP 132 in the course of its processing.

Gateway 130 is further coupled to at least one flash controller 140, which controls a bulk non-volatile memory system, such as a NAND flash memory system 150. Flash controller (FC) 140 services I/O commands, for example, by accessing NAND flash memory systems 150 to read or write the requested data from or into NAND flash memory systems 150, as discussed further below. In various embodiments, flash controller 140 can be implemented, for example, by an Application Specific Integrated Circuit (ASIC) or a Field Programmable Gate Array (FPGA)). In embodiments in which flash controller 140 is implemented with an FPGA, GPP 132 may program and configure flash controller 140 during start-up of data storage system 120.

Flash controller 140 is coupled to flash controller memory, which in this embodiment includes both flash controller non-volatile memory 142 and flash controller volatile memory 144. Flash controller non-volatile memory 142 may be implemented, for example, with MRAM, FRAM, PCM, battery-backed DRAM, or other non-volatile memory technology, and flash controller volatile memory 144 may be implemented with a relatively inexpensive volatile memory technology, such as DRAM. As further indicated in FIG. 1B, flash controller non-volatile memory 142 includes a first host write cache 146a for buffering host write data associated with host write commands received from hosts, such as processor systems 102. The contents of host write cache 146a are mirrored by flash controller 140 in a second host write cache 146b implemented in flash controller volatile memory 144. Host write caches 146a and 146b may further be attached to the same memory bus to enable mirrored data to be written into the two write caches 146a, 146b using a single command as would be appreciated by one skilled in the art upon reading the present description.

Flash controller 140 implements a Flash Translation Layer (FTL) that provides logical-to-physical address translation to enable access to specific memory locations within NAND flash memory systems 150. In general, an I/O command received by flash controller 140 from a host device, such as a processor system 102, contains the logical block address (LBA) at which the data is to be accessed (read or written) and, if a host write command, the host write data to be written to data storage system 120. The I/O command may also specify the amount (or size) of the data to be accessed. Other information may also be communicated depending on the protocol and features supported by data storage system 120. As is known to those skilled in the art, in some implementations of NAND flash memory, the smallest granule of data that can be accessed by a host read or host write command is fixed at the size of a single physical page, for example, 16 kilobytes (kB). The LBA provided by the host device corresponds to a logical page within a logical address space, which may have a size, for example, of 4 kB or 16 kB. This logical page can be further compressed by flash controller 140 so that each physical page can store one or more logical pages. The FTL translates the LBA into a physical address assigned to a corresponding physical location in NAND flash memory system 150. Flash controllers 140 may store mappings between logical and physical addresses in a logical-to-physical translation data structure, such as a logical-to-physical translation (LPT) table 152, which may conveniently be stored in flash controller volatile memory 144.

As further shown in FIG. 1B, in the depicted embodiment, flash controller volatile memory 144 additionally includes a relocation write buffer 148 for buffering data collected by the garbage collection process that is to be relocated within NAND flash memory system 150. In addition, flash controller volatile memory 144 may optionally include a read cache 156 for buffering data from NAND flash memory system 150 that has been recently and/or frequently requested by host read commands. Flash controller 140 may also store within flash controller volatile memory 144 threshold voltage (Vth) shift data 154 utilized to calibrate the read threshold voltages of the various subsets (e.g., page groups) of NAND flash memory system 150, as well as other management data structures 158 storing management data such as bit error rate (BER) and other statistics, program/erase (P/E) cycle counters, journaling information, etc.

NAND flash memory systems 150 may take many forms in various embodiments. Referring now to FIGS. 2-5, there is depicted an exemplary arrangement of physical memory within a NAND flash memory system 150 in accordance with one embodiment.

Figure 2:
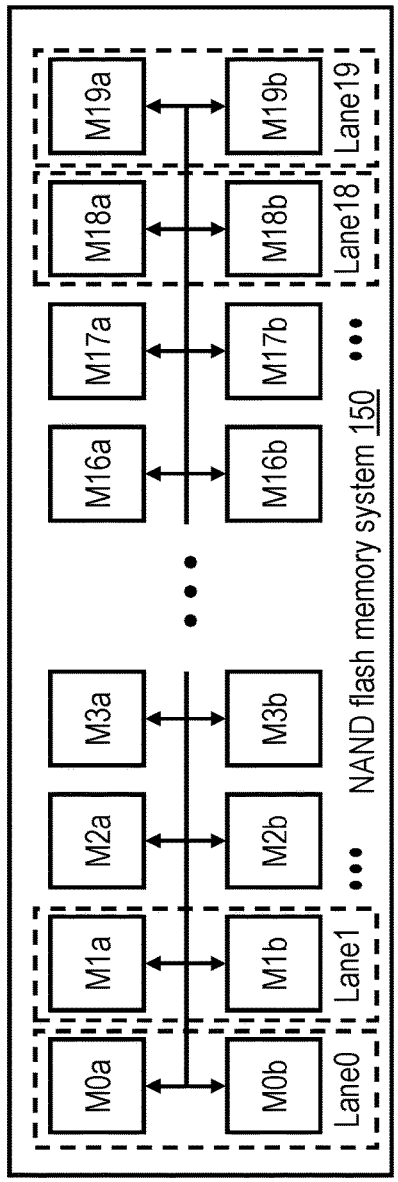
FIGS. 2-5 illustrate an exemplary arrangement of physical memory within a NAND flash memory system in accordance with the present disclosure.

As shown in FIG. 2, NAND flash memory system 150 may be formed from forty (40) individually addressable NAND flash memory storage devices. In the illustrated example, each of the flash memory storage devices M0a-M19b takes the form of a board-mounted flash memory module capable of storing two or more bits per cell. In one particular embodiment, the memory modules are implemented with Quad Level Cell (QLC) NAND flash memory, which is configured to operate in a hybrid tiered arrangement including a first pool of physical blocks operating in QLC mode and a second pool of physical blocks operating in a single level cell (SLC) mode. The forty NAND flash memory modules are arranged in twenty groups of two, (M0a, M0b) through (M19a, M19b). For purposes of the physical addressing scheme, each group of two modules forms a "lane," also sometimes referred to as a "channel," such that NAND flash memory system 150 includes twenty channels or lanes (Lane0-Lane19).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, flash controller 140 can issue commands and send or receive data across the various communication buses at the same time, enabling the flash controller 140 to access the flash memory modules corresponding to the individual lanes at, or very nearly at, the same time.

Figure 3:
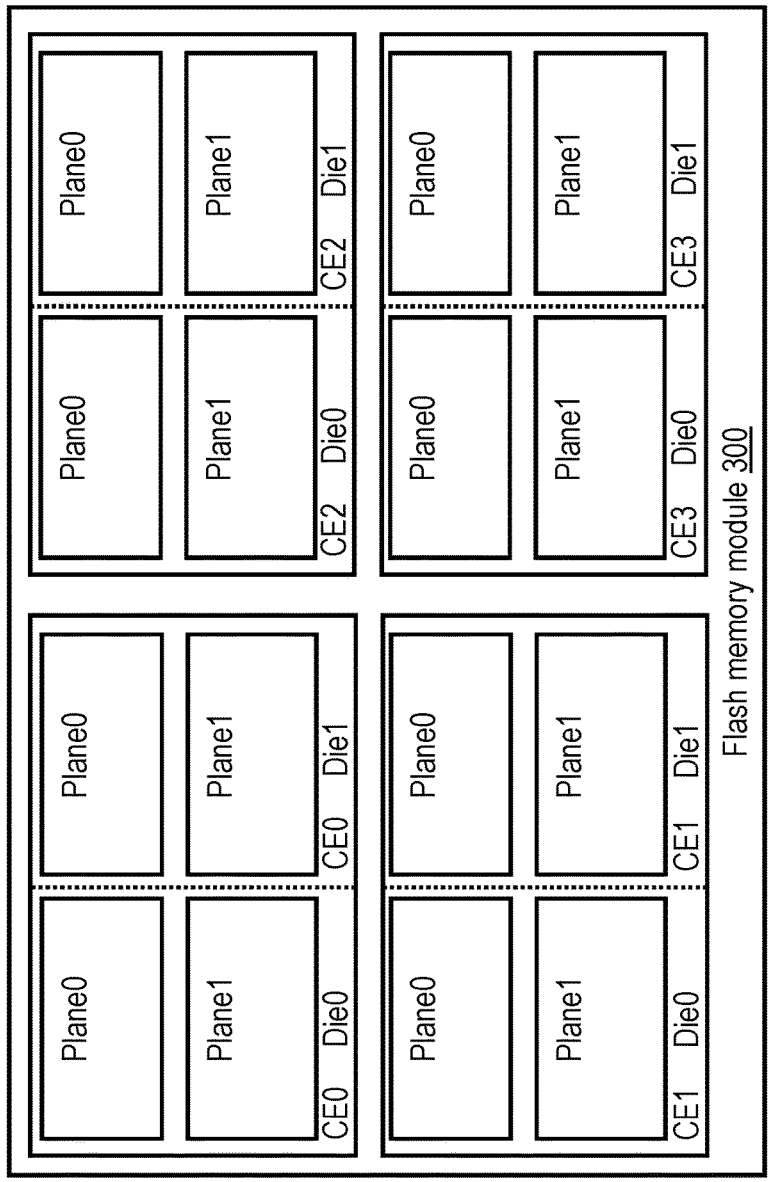

With reference now to FIG. 3, there is illustrated an exemplary embodiment of a flash memory module 300 that can be utilized to implement any of flash memory modules M0a-M19b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two or four planes (e.g., Plane0 and Plane1). Each plane represents a collection of physical blocks that, because of the physical layout of the flash memory chips, are physically associated with one another and that utilize common circuitry (e.g., I/O buffers) for the performance of various operations, such as read and write operations.

Figure 4:
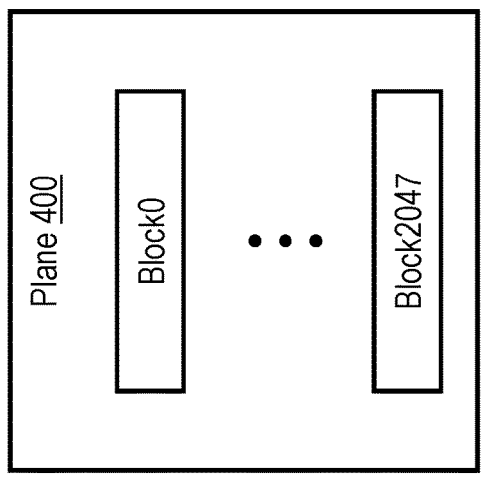
Figure 5:
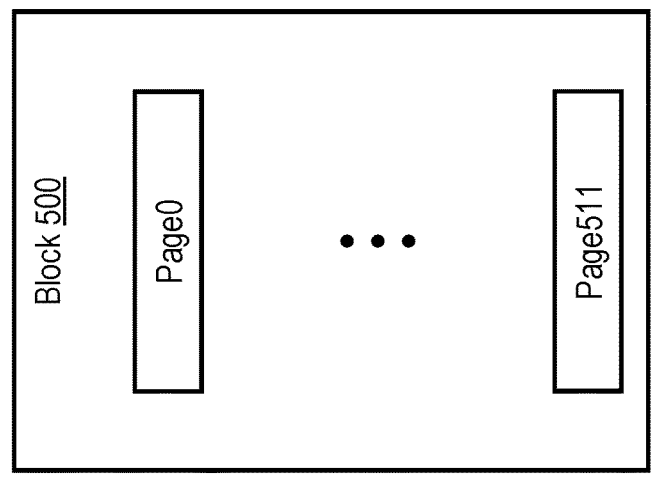

As further shown in FIGS. 4-5, an exemplary plane 400, which can be utilized to implement any of the planes within flash memory module 300 of FIG. 3, includes, for example, 512, 2048, or 4096 blocks of physical memory. Some manufacturers include additional blocks to this nominal block count as some blocks may fail early due to manufacturing defects. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes several hundreds or thousands of pages, for example, 512, 1024, or 4096 physical pages, where a physical page is defined to be the smallest individually addressable data unit for read and write access. In the exemplary system, each physical page of data has a common capacity (e.g., 16 kB) for data storage plus additional storage for page metadata. Thus, data is typically written into or read from NAND flash memory system 150 on a page-by-page basis, but erased on a block-by-block basis.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is smaller in size than the total available physical memory (i.e., it is beneficial to over-provision NAND flash memory system 150). Over-provisioning in this manner ensures that physical memory resources are available when the logical address space is fully utilized, even given the presence of a certain amount of invalid data as described above. In addition to invalid data that has not yet been reclaimed the over-provisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
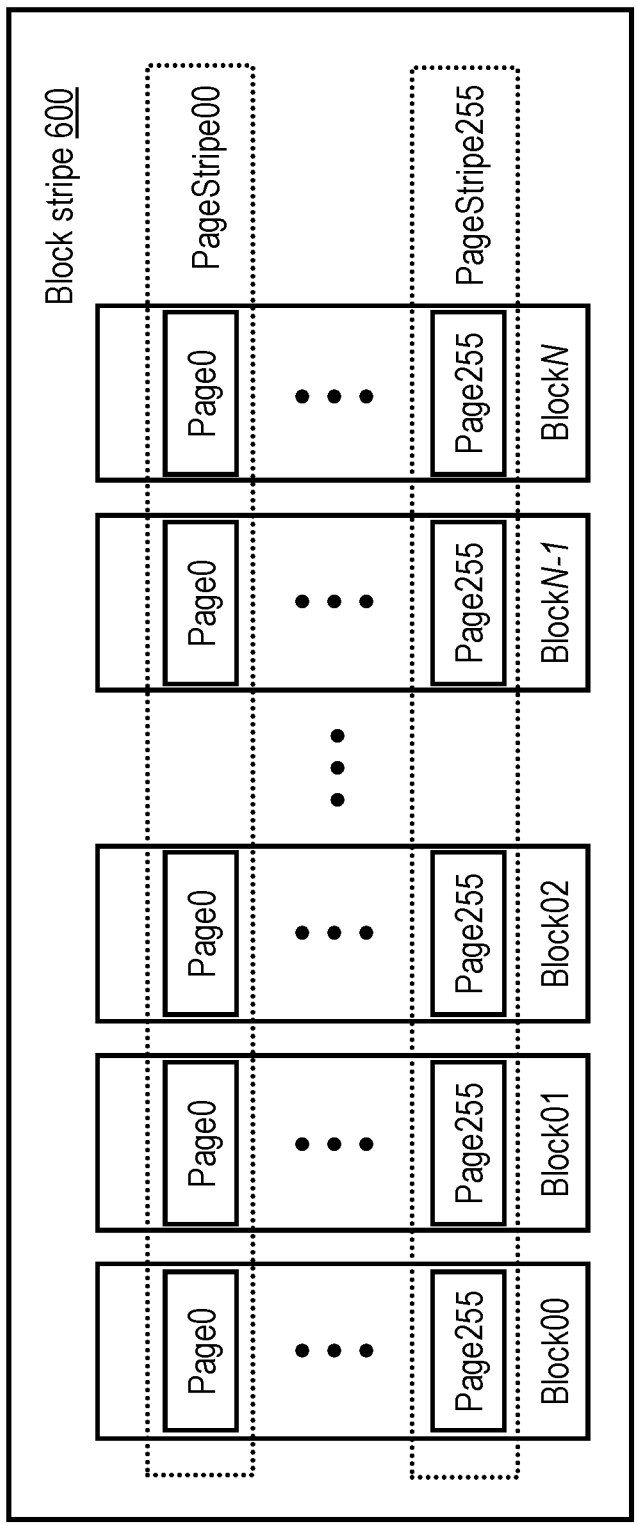
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In one embodiment, all pages of a page stripe are associated with different lanes to achieve high write bandwidth. Because in many implementations the smallest erase unit is a block, multiple page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can vary, but in one embodiment in which NAND flash memory system 150 includes 20 lanes, each block stripe includes between two and twenty blocks, with each block coming from a different lane.

Figure 6B:
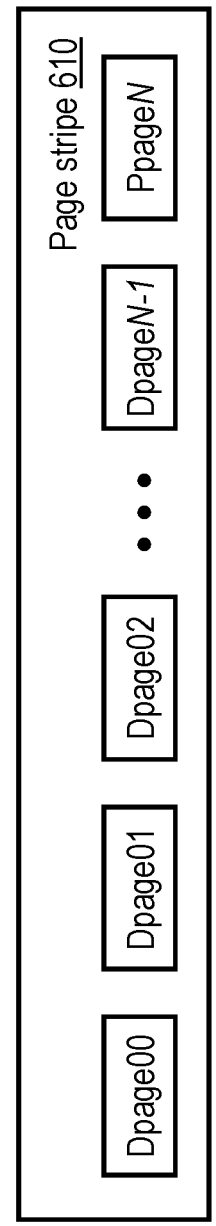
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can vary, in one embodiment each page stripe includes one to twenty data pages of write data (typically provided by a host device). In another embodiment, a page stripe includes one to nineteen data pages of write data and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

Having described the general physical structure and operation of exemplary embodiments of a data storage system 120, certain operational aspects of data storage system 120 are now described with reference to FIG. 7, which is a high-level data flow diagram illustrating the flash management functions and data structures employed by GPP 132 and/or flash controller 140 in accordance with one embodiment.

As noted above, data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 152, which can be stored in the associated flash controller volatile memory 144. It should be noted that the logical address supplied to flash controllers 140 may be different from the logical address originally supplied to data storage system 120, since various components within data storage system 120 may perform address translation operations between the external devices and the flash controllers 140.

As will be appreciated, implementation of a mirrored host write cache 146b in flash controller volatile memory 144 reduces the available capacity in flash controller volatile memory 144 for other meta-data, such as LPT 152. In at least some embodiments, the footprint of LPT 152 in flash controller volatile memory 144 can be reduced by flash controller 140 implementing a paging mechanism. In such embodiments, a backing store of LPT entries is maintained in NAND flash memory system 150, and flash controller 140 pages LPT entries to and from the backing store as needed.

Flash management code running on the GPP 132 tracks erased blocks of NAND flash memory system 150 that are ready to be used in ready-to-use (RTU) queues 700, which may be stored, for example, in GPP memory 134. In the depicted embodiment, flash management code running on the GPP 132 preferably maintains one or more RTU queues 700 per plane or channel, and an identifier of each erased block that is to be reused is enqueued in one of the RTU queues 700 corresponding to its channel. For example, in one embodiment, RTU queues 700 include, for each channel, a respective RTU queue 700 for each of a plurality of block health grades. In various implementations, between 2 and 8 RTU queues 700 per plane (and a corresponding number of block health grades) have been found to be sufficient.

A build block stripes function 702 (e.g., performed by flash management code running on the GPP 132) constructs new block stripes from the erased blocks enqueued in RTU queues 700. As noted above with reference to FIG. 6A, block stripes are preferably formed of blocks of the same or similar health (i.e., expected remaining useful life) residing in different channels, meaning that block stripes can conveniently be constructed by build block stripes function 702 by drawing each block of the new block stripe from corresponding RTU queues 700 of different planes or channels. The new block stripe is then queued to flash controller 140 for data placement by a data placement function 704.

Data placement function 704 includes open block queues 706, which track identifiers of not-fully programmed blocks in the block stripes constructed by build block stripes function 702. As further illustrated in FIG. 7, data placement function 704 additionally includes a caching engine 714 for writing host write data into mirrored host write caches 146a, 146b and for writing relocation write data into relocation write buffer 148. Data placement function 704 also includes a destaging engine 716 for writing data from host write cache 146b and relocation write buffer 148 into open blocks of NAND flash memory system 150 identified in open block queues 706.

In response to a host write command received from a host such as a processor system 102, data placement function 704 of flash controller 140 determines by reference to LPT table 152 whether the target LBA(s) indicated in the host write command is/are currently mapped to physical page(s) in NAND flash memory system 150 and, if so, changes the status of each data page currently associated with a target LBA to indicate that it is no longer valid. Caching engine 714 additionally writes the host write data of the host write command into both host write caches 146a, 146b, preferably in parallel using a single operation (e.g., the host write data traverses the memory bus only once). Once the update to host write cache 146a is complete, caching engine 714 can immediately provide an acknowledgement message ("Ack") to the issuing host via I/O channel 110. Caching engine 714 also updates the entry in LPT 704 for the LBA indicated by the host write command to point to the location of the host write data in host write cache 146a and/or host write cache 146b.

To service a host write command, data placement function 702 additionally allocates a page stripe if necessary to store the write data of the host write command and any non-updated data (i.e., in case the write request is smaller than a logical page, there is still valid data which needs to be handled in a read-modify-write manner) from an existing page stripe, if any, targeted by the host write command, and/or stores the write data of the host write command and any non-updated (i.e., still valid) data from an existing page stripe, if any, targeted by the host write command to an already allocated page stripe that has free space left. The page stripe may be allocated from either a block stripe already allocated to hold data or from a new block stripe. In a preferred embodiment, the page stripe allocation can be based on the health of the blocks available for allocation and the "heat" (i.e., estimated or measured write access frequency) of the LBA of the write data. Destaging engine 716 of data placement function 704 then writes the host write data and associated metadata (e.g., CRC and ECC values) for each codeword from host write cache 146b into pages of the allocated page stripe identified in open block queues 706, and additionally, writes parity information into the data protection page of the allocated page stripe, if needed. Destaging engine 716 also updates LPT table 152 to associate the LBA(s) of the host write data with addresses of the physical page(s) in NAND flash memory 150 utilized to store the write data. Thereafter, flash controller 140 can access the data from NAND flash memory 150 to service host read commands by reference to LPT table 152.

Once all pages in a block stripe have been written or the block stripe is otherwise closed, flash controller 140 places an identifier of the block stripe on one of occupied block queues 708, which flash management code running on the GPP 132 utilizes to track blocks for garbage collection and other management functions. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 720. Garbage collector 720 selects particular block stripes for garbage collection based on a number of factors including, for example, the health of the physical blocks within the block stripes and how much of the data within the physical blocks is invalid. In at least one embodiment, garbage collection is performed on entire block stripes, and garbage collector 720 issues relocation write commands to caching engine 714 of data placement function 704 to relocate the still-valid data in a garbage-collected block stripe to another block stripe. In NAND flash memory systems 150 implementing hybrid tiered arrangement including a first pool of physical blocks operating in higher storage density mode (e.g., QLC mode) and a second pool of physical blocks operating in a lower storage density mode (e.g., SLC mode), it is desirable to permit garbage-collected data to be written from old blocks operating in either mode to new blocks operating in either mode. Thus, the relocation write commands issued by garbage collector 720 may specify the desired operating mode of the target block stripe to support, for example, QLC-to-QLC, SLC-to-QLC, SLC-to-SLC, or QLC-to-SLC garbage collection.

Figure 7:
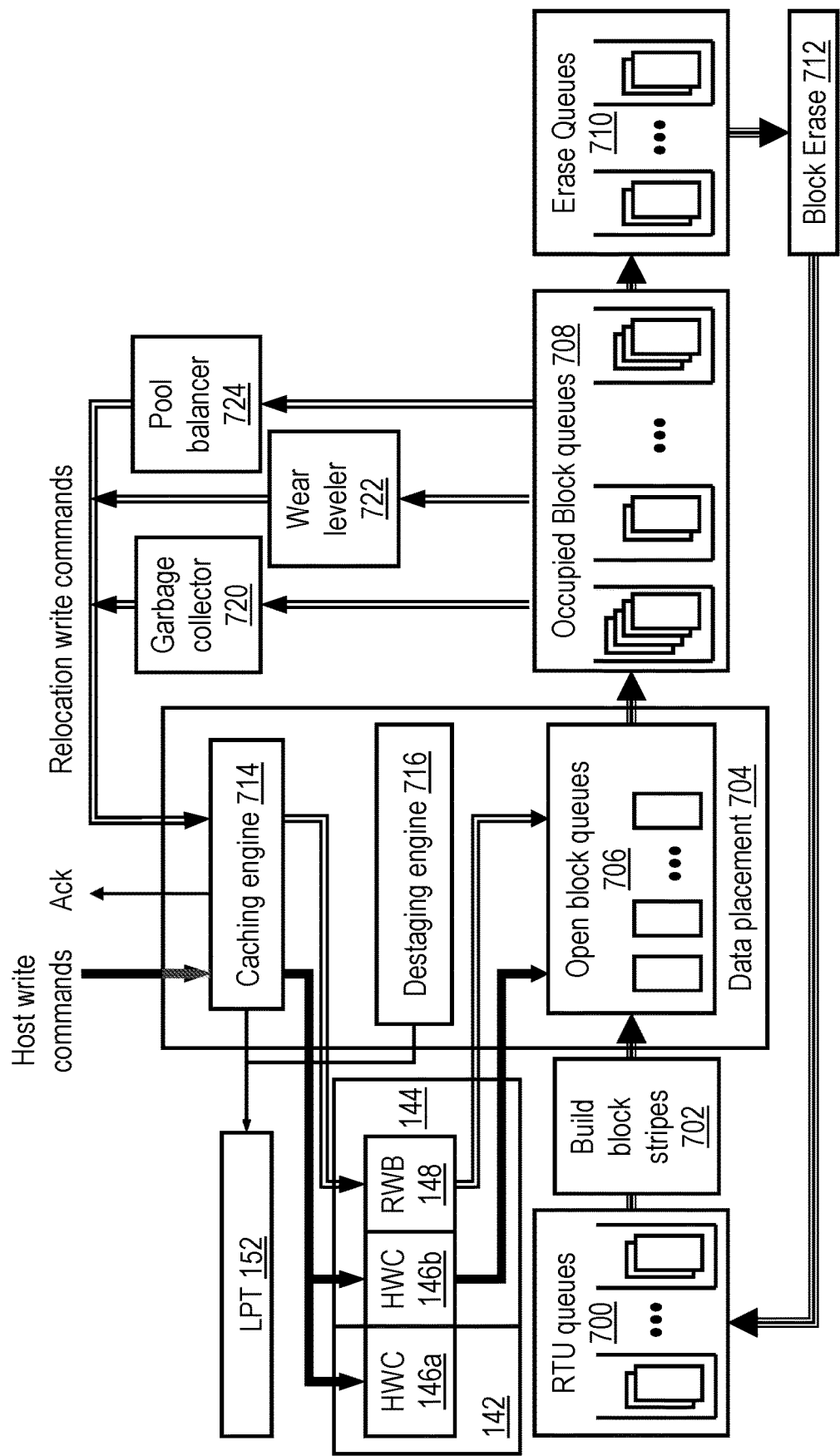
FIG. 7 is a high-level data flow diagram of the flash management functions and data structures employed by a flash controller in accordance with one embodiment.

As further indicated in FIG. 7, the flash management functions performed by GPP 132 and/or flash controller 140 additionally include a wear leveler 722 that requests relocation of data held in block stripes in occupied block queues 708 to equalize wear across blocks and a pool balancer 724 that requests the relocation of data held in certain block stripes to allow some or all of the constituent blocks to be reconfigured to operate in a different operating mode (e.g., QLC or SLC).

Based on the relocation write commands received from garbage collector 720, wear leveler 722, and pool balancer 724, caching engine 714 stores relocation write data from the old block stripes into relocation write buffer 148 in flash controller volatile memory 144. In addition, caching engine 714 may update LPT table 152 to additionally point to the location in relocation write buffer 148. Once all still valid data has been moved from the old block stripe and written to new pages of the allocated page stripes identified in open block queues 706, destaging engine 716 updates LPT table 152 to remove the current association between the logical and physical addresses of the data and to associate the LBA(s) of the relocated data with addresses of the physical page(s) in NAND flash memory 150 utilized to store the relocated data. Then, the old block stripe is dissolved, thus disassociating the blocks, and identifiers of the blocks are enqueued in erase queues 710, which may include one erase queue 710 per channel. A block erase function 712 of flash controller 140 then erases each of the blocks formerly forming the dissolved block stripes and increments an associated program/erase (P/E) cycle count for the block in management data structures 158. Based on the health metrics of each erased block, each erased block is either retired (i.e., no longer used to store user data), or alternatively, prepared for reuse by placing the block's identifier on the appropriate ready-to-use (RTU) queue 700 in the associated GPP memory 134.

Figure 8:
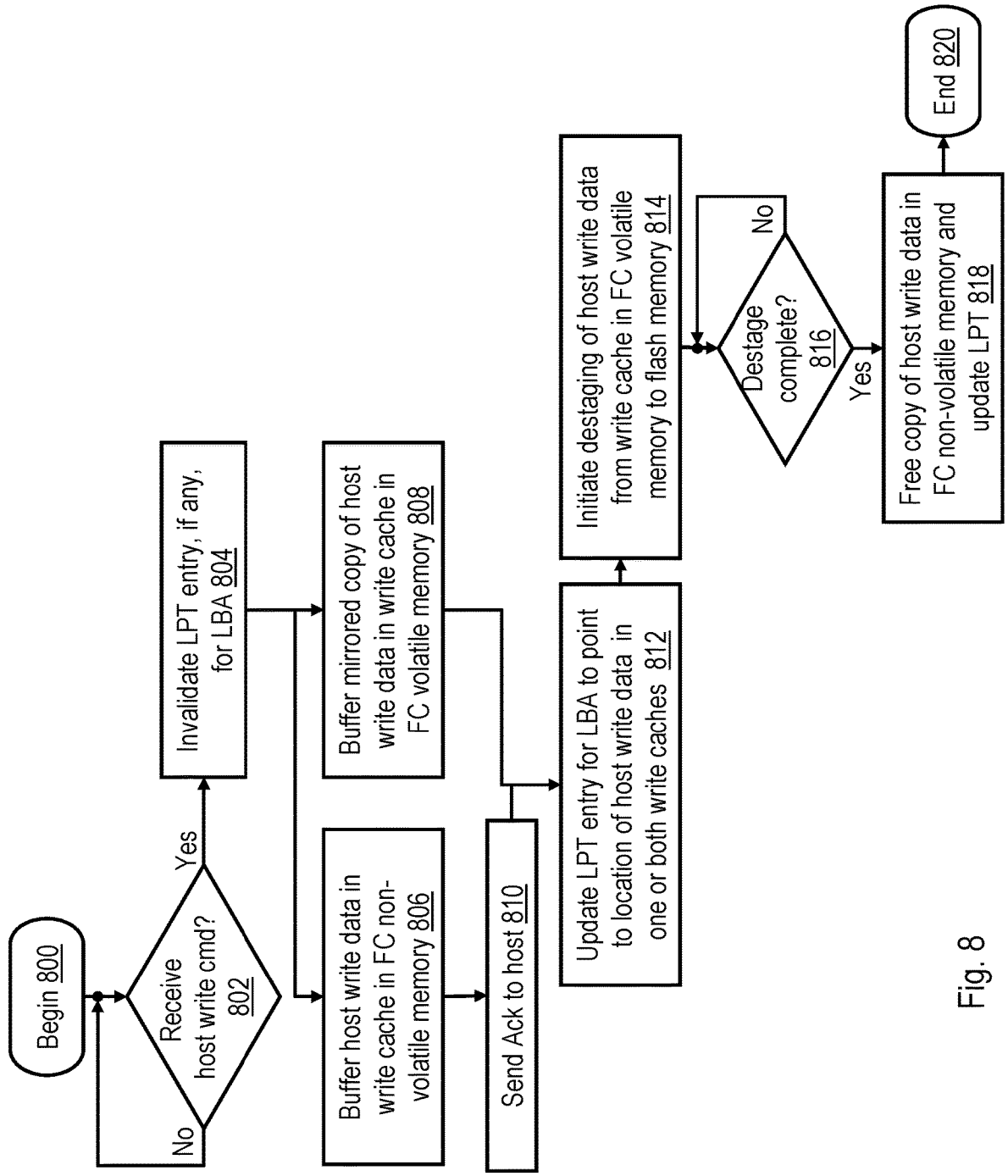
FIG. 8 is a high-level logical flowchart of an exemplary method by which a controller services a host write command in a non-volatile memory system in accordance with one embodiment.

Referring now to FIG. 8, there is depicted a high-level logical flowchart of an exemplary method by which a controller services a host write command in a non-volatile memory system in accordance with one embodiment. The illustrated process can be performed, for example, by a controller (e.g., GPP 132 and/or flash controller 140) in hardware, firmware, software or a combination thereof during operation of a data storage system 120. Unless specifically stated otherwise, operations are presented in logical rather than strictly chronological order, and in some embodiments, operations can be performed in a different order than presented or concurrently.

The process of FIG. 8 begins at block 800 and then proceeds to block 802, which illustrates the controller monitoring for receipt of a host write command from a host, such as a processor system 102. The host write command includes or has associated therewith an LBA to be written and host write data. In response to detection of a host write command, the controller invalidates the entry, if any, for the LBA in LPT 152. The process proceeds from block 804 to blocks 806 and 808, preferably in parallel. Block 806 illustrates the controller buffering the host write data of the host write in host write cache 146*a* in flash controller non-volatile memory 142. Block 808 depicts the controller additionally mirroring the host write data of the host write in host write cache 146*b* in flash controller volatile memory 144.

The minimum size of host write caches 146*a*, 146*b* needed to buffer host write data increases with the internal parallelism and number of supported write streams as well as the supported write bandwidth and average write latency. For a controller with given write bandwidth and latency characteristics, the minimum size can be computed as a function of the physical page size, the number of lanes and planes, the maximum number of outstanding page stripes, and the number of supported write streams and bins. For example, for a NAND flash memory system 150 implementing 16 kB pages, 20 lanes with 4 planes grouped into a stripe, and 4 outstanding word-lines (i.e., 16 page stripes), the minimum size of host write caches 146*a*, 146*b* can be determined to be 16 kB×20×4×16=20 MB per stream/bin.

Figure 9:
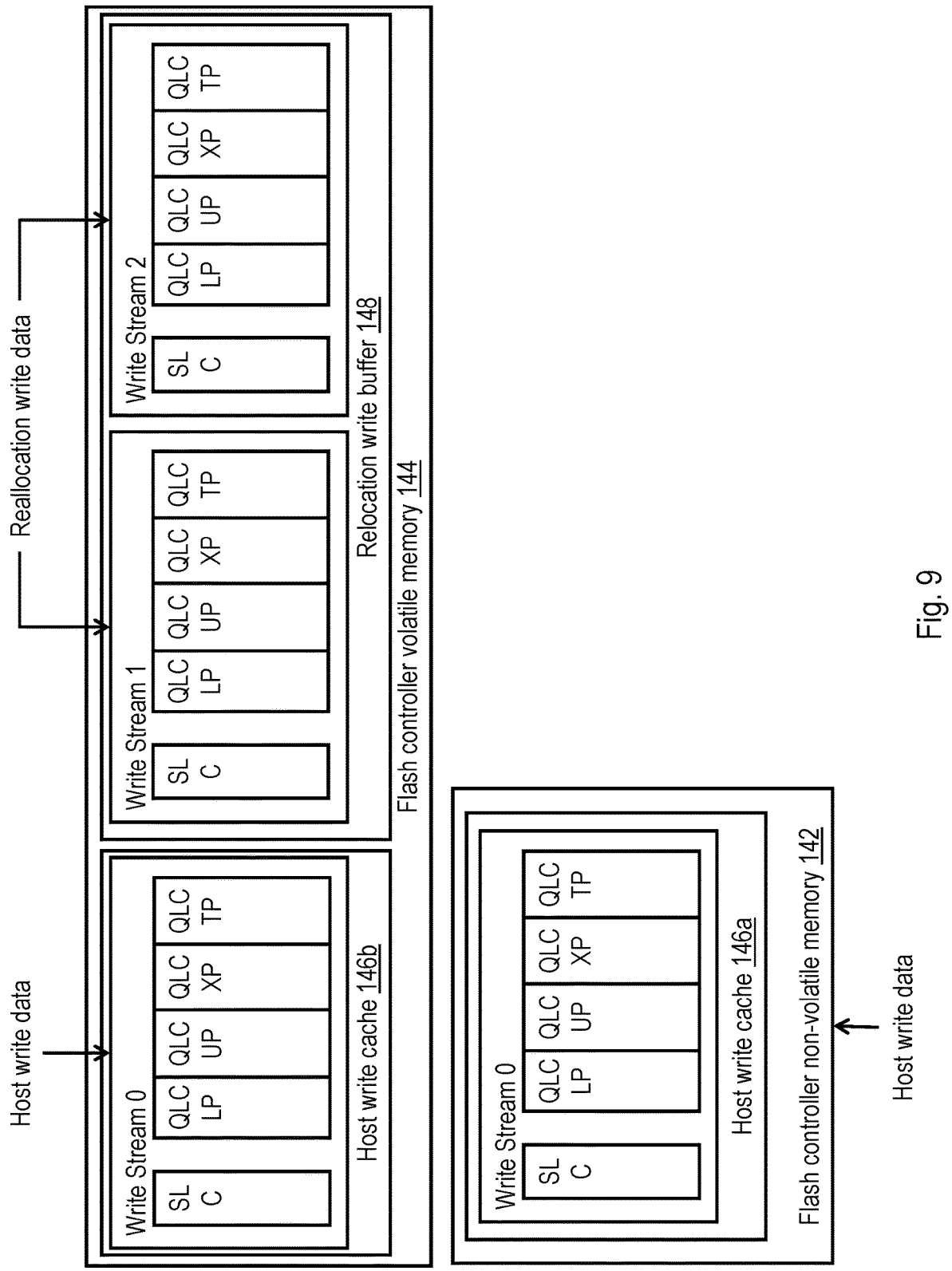
FIG. 9 illustrates an exemplary data structure in which a controller supports both separation of host write data and reallocation write data into different write streams and read heat separation within the write streams in accordance with one embodiment.

With reference to FIG. 9, there is illustrated an exemplary data structure in which a controller supports both separation of host write data and reallocation write data into different write streams and read heat separation within the write streams in accordance with one embodiment. In this exemplary embodiment, flash controller 140 implements one write stream of host write data and two write streams of relocation write data. Each write stream includes 5 write bins, including one write bin for SLC data and four write bins for QLC data. The four write bins for QLC data include a respective bin for each QLC page type, namely, lower pages (LP), upper pages (UP), extra pages (XP), and top pages (TP). Flash controller 140 directs data to the various QLC write bins based on relative read heat, for example, with the coldest QLC write data being buffered in the QLC TP buffer, the next warmer QLC write data being buffered in the QLC XP buffer, the next warmer QLC write data being buffer in the QLC UP buffer, and the warmest QLC write data being buffered in the QLC LP buffer. While implementation of various heat bins increases the minimum size of host write caches 146*a*, 146*b*, reducing the number of write streams and/or heat bins to reduce the footprint of host write caches 146*a*, 146*b* is not preferred, as overall write amplification would increase or read heat separation efficiency would decrease significantly.

Returning to block 806 of FIG. 8, based on the host write data of the host write command being buffered in host write cache 146*a*, the controller sends an acknowledgement of the host write command to the initiating host via I/O channel 110 (block 810). As noted above, the acknowledgement message signifies persistent storage of the host write data and thus signals to the host that resources allocated to the host write command can be freed for reuse. The process of FIG. 8 proceeds from blocks 810 and 808 and rejoins at block 812, which depicts the controller updating the entry in LPT 152 for the LBA of the host write command to point to the location of the host write data in one or both of write caches 146a, 146b. As a result, in at least some embodiments, the controller can begin to service host read commands requesting the host write data from write cache 146b.

At block 814, the controller initiates destaging of the host write data from write cache 146b (and not from write cache 146a) into NAND flash memory system 150 in accordance with the assignment of data to buffers in host write cache 146b. By refraining from destaging host write data from write cache 146a, accesses to flash controller non-volatile memory 142 are limited to a single write per host write command in the normal case. In a preferred embodiment, the destaging of the host write data is performed in the "background" while the controller is not busy servicing other host I/O commands or performing other management functions. The controller monitors for completion of the destaging of the host write data from write cache 146b to NAND flash memory system 150 (block 816). In response to detection that the destaging of the host write data is complete, the controller can free (invalidate) the copy of the host write data residing in host write cache 146a because the host write data is persistently stored in NAND flash memory system 150 (block 818). Note that the copy of the host write data may be kept in host write cache 146b for serving future host reads of the data. This is beneficial, for example, when the size of host write cache 146b is larger than that of host write cache 146a. Alternatively, host write data in host write cache 146b could also be freed at the same time as the copy in host write cache 146a. The decision to free or keep the host write data in host write cache 146b may depend on, for example, the implemented caching policy, the likelihood that the host write data will be read in the future, and/or the available size of host write cache 146b. Thereafter, the process of FIG. 8 ends at block 820.

Although not explicitly shown in FIG. 8, those skilled in the art will appreciate that, in the event of power loss to a flash card 126 or data storage system 120 while a host write command is being serviced, data loss will be avoided. In that case, the host write data can either be recovered by the host from a host queue or by the controller from the persistent copy buffered in write cache 146a. However, in the case of normal operation in the absence of a power loss, the disclosed process includes the following four internal data movements within a flash card 126:
1. one write into non-volatile write cache 146a;
2. one write into mirrored volatile write cache 146b;
3. one read from mirrored volatile write cache 146b; and
4. one write into NAND flash memory system 150.

As will be appreciated, limiting the accesses to non-volatile write cache 146a to one write access per host write command greatly reduces the required bandwidth to non-volatile write cache 146a as compared to prior art solutions and thus lowers the minimum required size (and cost) of non-volatile write cache 146a. Alternatively, the saved space in the non-volatile write cache could also be used to increase the number of write streams and hence improve heat separation.

Figure 10:
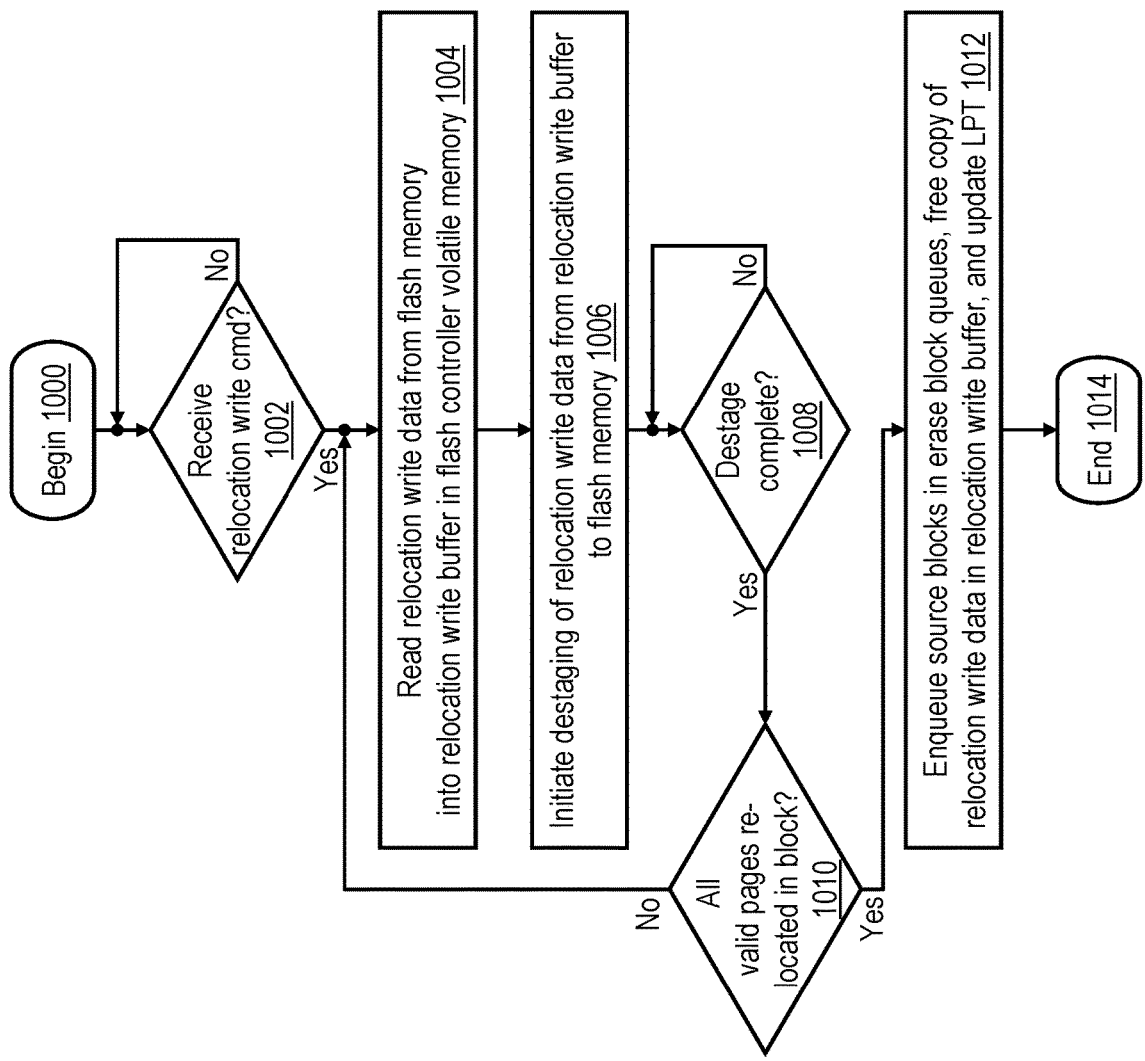
FIG. 10 is a high-level logical flowchart of an exemplary method by which a controller services a relocation write command in a non-volatile memory system in accordance with one embodiment.

Referring now to FIG. 10, there is depicted a high-level logical flowchart of an exemplary method by which a controller services a relocation write command in a non-volatile memory system in accordance with one embodiment. The illustrated process can be performed, for example, by a controller (e.g., GPP 132 and/or flash controller 140) in hardware, firmware, software or a combination thereof during operation of a data storage system 120. Again, operations are presented in logical rather than strictly chronological order, and in some embodiments, operations can be performed in a different order than presented or concurrently.

The process of FIG. 10 begins at block 1000 and then proceeds to block 1002, which illustrates the controller monitoring for receipt of a relocation write command, for example, from garbage collector 720, wear leveler 722, or pool balancer 724. The relocation write command specifies one or more physical blocks (e.g., a block stripe) in NAND flash memory 150 from which relocation write data is to be relocated. In response to detection of a relocation write command, the controller reads at block 1004 one or more still-valid data pages from the physical blocks (referred to herein as "relocation write data") from NAND flash memory 150 into relocation write buffer 148 in flash controller volatile memory 144 (block 1004). It should be noted that the controller refrains from buffering any of the relocation write data in flash controller non-volatile memory 142.

At block 1006, the controller initiates destaging of the relocation write data from relocation write buffer 148 into a block stripe in NAND flash memory system 150 identified in open block queues 706. In a preferred embodiment, the destaging of the relocation write data is performed in the "background" while the controller is not busy servicing other host I/O commands or performing other management functions. The controller monitors for completion of the destaging of the relocation write data from relocation write buffer 148 to NAND flash memory system 150 (block 1008). In response to detection that the destaging of the relocation write data is complete, the controller checks whether all still-valid pages have been relocated from the block or block stripe being relocated (block 1010). In case there are more pages to be relocated, the controller returns to block 1004 to read the next one or more still-valid pages as described above. When there are no remaining still-valid pages, the controller enqueues identifiers of the source blocks from which the relocation write data was read in erase queues 710 and can free (invalidate) the copy of the relocation write data residing in relocation write buffer 148 (block 1012). At block 1012, the controller additionally updates the relevant entries in LPT 152 to point to the new storage location in NAND flash memory 150. Thereafter, the process of FIG. 10 ends at block 1014.

In the case of normal operation (i.e., no power loss), the disclosed process for handling relocation write commands includes the following four internal data movements within a flash card 126:
1. one read from NAND flash memory system 150;
2. one write into relocation write buffer 148 in flash controller volatile memory 148;
3. one read from relocation write buffer 148; and
4. one write into NAND flash memory system 150.

As will be appreciated, eliminating any access to non-volatile write cache 146a while servicing relocation write commands greatly reduces the required bandwidth to non-volatile write cache 146a as compared to prior art solutions and thus lowers the minimum required size (and cost) of non-volatile write cache 146a. Alternatively, the saved space in the non-volatile write cache could also be used to increase the number of write streams and hence improve heat separation.

Figure 11:
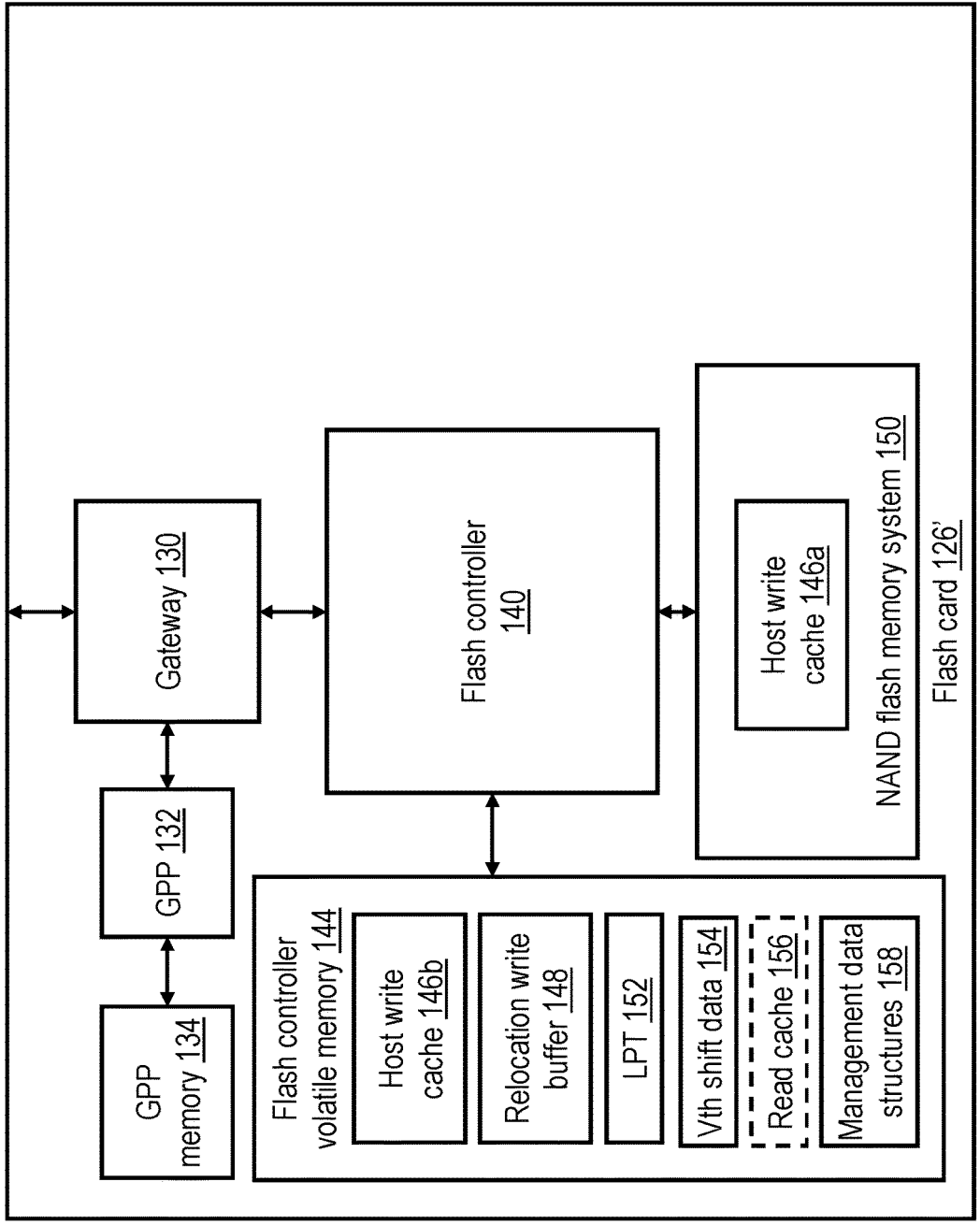
FIG. 11 is a block diagram of an exemplary flash card of the data storage system of FIG. 1A in accordance with a second embodiment.

With reference now to FIG. 11, there is illustrated a block diagram of an exemplary flash card of the data storage system of FIG. 1A in accordance with a second embodiment. As indicated by like reference numerals, the illustrated flash card 126' includes mirrored host write caches 146a, 146b that are employed as previously described with respect to FIGS. 8 and 10. However, flash card 126' omits a separate flash controller non-volatile memory 142 and instead implements host write cache 146a within the bulk non-volatile memory in NAND flash memory system 150. This second embodiment can come at lower cost due to the omission of flash controller non-volatile memory, but typically exhibits lower write performance due to the longer latency of writes to NAND flash memory system 150. This longer write latency can be ameliorated in part by implementing host write cache 146a exclusively in the faster SLC storage tier (i.e., either QLC blocks configured to operate in SLC mode or in dedicated SLC flash memory).

As has been described, in at least one embodiment, a data storage system provides persistent storage in bulk non-volatile memory. A controller of the data storage system receives a host write command and buffers associated host write data in both a first write cache in non-volatile memory and a mirrored second write cache in volatile memory. The controller destages the host write data to the bulk non-volatile memory from the second write cache but not the first write cache. The controller services relocation write commands requesting data relocation within the bulk non-volatile memory by reference to the second write cache. Servicing the relocation write commands includes buffering relocation write data in the second write cache but not the first write cache and destaging the relocation write data to the bulk non-volatile memory from the second write cache.

In at least one embodiment, prior to completion of the destaging of the host write data to the bulk non-volatile memory, the controller sends to a host an acknowledgement of the host write command based on the host write data being buffered in the first write cache.

In at least one embodiment, the bulk non-volatile memory includes flash memory and the controller generates at least some of the relocation write commands during garbage collection in the flash memory.

In at least one embodiment, the controller frees, in the first write cache, the host write data of the host write command based on completion of destaging of the host write data to the bulk non-volatile memory.

In at least one embodiment, the controller records in an entry of a logical-to-physical translation data structure at least a first location of host write data in the first write cache. Based on destaging of the host write data to the bulk non-volatile memory, the controller updates the entry to indicate a different second location in the bulk non-volatile memory.

In at least one embodiment, the controller additionally records in the entry of the logical-to-physical translation data structure a third location of host write data in the second write cache.

In at least one embodiment, the bulk non-volatile memory includes the first write cache.

In at least one embodiment, the controller maintains in the first write cache and in the second write cache a plurality of buffers each corresponding to a respective one of a plurality of different write heats.

By reducing the bandwidth demands on the non-volatile write cache to a single write per host write command in the normal case, the disclosed embodiments improve the design tradeoff between size of the flash controller non-volatile memory and its contribution to the cost of the data storage system. In particular, in some embodiments, the disclosed embodiments enable a given number of write streams and a sufficient write bandwidth to be maintained, while reducing the size (and therefore cost) of the non-volatile write cache. Alternatively, in other embodiments, additional write streams yielding greater performance can be implemented at the same cost utilizing a given size of non-volatile write cache. In yet other embodiments, some cost reduction can be achieved while implementing a greater number of write streams at same overall write bandwidth.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the appended claims. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system providing storage in bulk non-volatile memory, the method comprising:
   a controller of the data storage system receiving a host write command and buffering associated host write data in both a first write cache in non-volatile memory and a mirrored second write cache in volatile memory;
   the controller destaging the host write data to the bulk non-volatile memory from the second write cache but not the first write cache;
   the controller servicing relocation write commands requesting data relocation within the bulk non-volatile memory by reference to the second write cache, the servicing including buffering relocation write data associated with relocation write commands in the second write cache but not the first write cache and destaging the relocation write data to the bulk non-volatile memory from the second write cache;
   the controller recording, in an entry of a logical-to-physical translation data structure, a first location of host write data in the first write cache and a second location of host write data in the second write cache; and the controller, based on destaging of the host write data to the bulk non-volatile memory, updating the entry to indicate a different third location in the bulk non-volatile memory.

2. The method of claim 1, further comprising:

prior to completion of the destaging of the host write data to the bulk non-volatile memory, the controller sending to a host an acknowledgement of the host write command based on the host write data being buffered in the first write cache.

3. The method of claim 1, wherein:

the bulk non-volatile memory includes flash memory; and the method includes the controller generating at least some of the relocation write commands during garbage collection in the flash memory.

4. The method of claim 1, further comprising:

the controller freeing, in the first write cache, the host write data of the host write command based on completion of destaging of the host write data to the bulk non-volatile memory.

5. The method of claim 1, wherein the bulk non-volatile memory includes the first write cache.

6. The method of claim 1, further comprising:

the controller maintaining, in each of the first write cache and the second write cache, a plurality of buffers each corresponding to a respective one of a plurality of different heats.

7. A data storage system comprising:

a controller of a bulk non-volatile memory, wherein the controller is configured to perform:

receiving a host write command and buffering associated host write data in both a first write cache in non-volatile memory and a mirrored second write cache in volatile memory;

destaging the host write data to the bulk non-volatile memory from the second write cache but not the first write cache;

servicing relocation write commands requesting data relocation within the bulk non-volatile memory by reference to the second write cache, the servicing including buffering relocation write data associated with relocation write commands in the second write cache but not the first write cache and destaging the relocation write data to the bulk non-volatile memory from the second write cache;

recording, in an entry of a logical-to-physical translation data structure, a first location of host write data in the first write cache and a second location of host write data in the second write cache; and based on destaging of the host write data to the bulk non-volatile memory, updating the entry to indicate a different third location in the bulk non-volatile memory.

8. The data storage system of claim 7, wherein the controller is further configured to perform:

prior to completion of the destaging of the host write data to the bulk non-volatile memory, sending to a host an acknowledgement of the host write command based on the host write data being buffered in the first write cache.

9. The data storage system of claim 7, wherein:

the bulk non-volatile memory includes flash memory; and the controller is further configured to perform generating at least some of the relocation write commands during garbage collection in the flash memory.

10. The data storage system of claim 7, wherein the controller is further configured to perform:

freeing, in the first write cache, the host write data of the host write command based on completion of destaging of the host write data to the bulk non-volatile memory.

11. The data storage system of claim 7, further comprising the bulk non-volatile memory, wherein the bulk non-volatile memory includes the first write cache.

12. The data storage system of claim 7, wherein the controller is further configured to perform:

maintaining, in each of the first write cache and the second write cache, a plurality of buffers each corresponding to a respective one of a plurality of different heats.

13. A program product, comprising:

a storage device; and program code stored in the storage device and executable by a controller of a bulk non-volatile memory to cause the controller to perform:

receiving a host write command and buffering associated host write data in both a first write cache in non-volatile memory and a mirrored second write cache in volatile memory;

destaging the host write data to the bulk non-volatile memory from the second write cache but not the first write cache;

servicing relocation write commands requesting data relocation within the bulk non-volatile memory by reference to the second write cache, the servicing including buffering relocation write data associated with relocation write commands in the second write cache but not the first write cache and destaging the relocation write data to the bulk non-volatile memory from the second write cache;

recording, in an entry of a logical-to-physical translation data structure, a first location of host write data in the first write cache and a second location of host write data in the second write cache; and based on destaging of the host write data to the bulk non-volatile memory, updating the entry to indicate a different third location in the bulk non-volatile memory.

14. The program product of claim 13, wherein the program code causes the controller to perform:

prior to completion of the destaging of the host write data to the bulk non-volatile memory, sending to a host an acknowledgement of the host write command based on the host write data being buffered in the first write cache.

15. The program product of claim 13, wherein:

the bulk non-volatile memory includes flash memory; and the program code causes the controller to perform generating at least some of the relocation write commands during garbage collection in the flash memory.

16. The program product of claim 13, wherein the program code causes the controller to perform:

freeing, in the first write cache, the host write data of the host write command based on completion of destaging of the host write data to the bulk non-volatile memory.

17. The program product of claim 13, wherein the bulk non-volatile memory includes the first write cache.

18. The program product of claim 13, wherein the program code causes the controller to perform:

maintaining, in each of the first write cache and in the second write cache, a plurality of buffers each corresponding to a respective one of a plurality of different heats.

* * * * *